United States Patent
Grant et al.

(10) Patent No.: US 10,552,625 B2
(45) Date of Patent: Feb. 4, 2020

(54) CONTEXTUAL TAGGING OF A MULTIMEDIA ITEM

(71) Applicant: International Business Machines Corporation, Armonk, NY (US)

(72) Inventors: Robert H. Grant, Austin, TX (US); Trudy L. Hewitt, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 127 days.

(21) Appl. No.: 15/169,784

(22) Filed: Jun. 1, 2016

(65) Prior Publication Data
US 2017/0351696 A1 Dec. 7, 2017

(51) Int. Cl.
G06F 21/62 (2013.01)
G06F 16/48 (2019.01)

(52) U.S. Cl.
CPC .............. *G06F 21/62* (2013.01); *G06F 16/48* (2019.01)

(58) Field of Classification Search
CPC ........ G06F 17/30867; G06F 17/30038; G06F 17/30525; G06F 17/30528; G06F 16/9535; G06F 21/6245; G06F 16/951; G06F 17/241; G06F 21/62; G06F 16/48
USPC ..... 705/44, 39, 14.55, 5, 7.32, 14.38, 14.45, 705/14.64, 14.66, 16, 17, 7.14, 7.28; 709/203, 204, 202, 217, 220, 224, 227, 709/231; 707/722, 785, 708, 754, 756, 707/770
See application file for complete search history.

(56) References Cited

U.S. PATENT DOCUMENTS

| 7,991,194 | B2 | 8/2011 | Kim et al. |
| 8,392,957 | B2 | 3/2013 | Holt et al. |
| 8,433,993 | B2 | 4/2013 | Weinberger et al. |
| 8,644,563 | B2 | 2/2014 | Akbarzadeh et al. |
| 8,671,069 | B2 | 3/2014 | Chang et al. |
| 8,744,173 | B2 | 6/2014 | Chen |
| 8,803,690 | B2 | 8/2014 | Junqua et al. |
| 9,111,181 | B2 | 8/2015 | Allen et al. |
| 9,275,420 | B1 | 3/2016 | Fredinburg et al. |
| 2011/0064281 | A1 | 3/2011 | Chan |
| 2011/0145327 | A1 | 6/2011 | Stewart |

(Continued)

FOREIGN PATENT DOCUMENTS

| WO | 2013095977 A1 | 6/2013 |
| WO | 2014164600 A1 | 10/2014 |

OTHER PUBLICATIONS

Hailu, Teshome, USPTO Office Action, U.S. Appl. No. 15/154,180, Notification dated Jan. 16, 2018, 27 pages.

(Continued)

*Primary Examiner* — Jay A Morrison
*Assistant Examiner* — Ken Hoang
(74) *Attorney, Agent, or Firm* — Nicholas D. Bowman; Hunter E. Webb; Keohane & D'Alessandro PLLC (57) ABSTRACT

Approaches presented herein enable automatically removing a potential tag of a subject depicted in a multimedia item based on a context of the multimedia item and one or more preferences of the subject being tagged. Specifically, a request to tag a subject in the multimedia item is received, and the multimedia item is analyzed to determine a context. The context is compared to the preferences related to the subject to determine a variance. If a variance exists, a removal action related to the tag is performed, such as disallowing or removing the potential tag.

20 Claims, 5 Drawing Sheets

(56) References Cited

U.S. PATENT DOCUMENTS

| | | |
|---|---|---|
| 2011/0202968 A1 | 8/2011 | Nurmi |
| 2012/0216257 A1 | 8/2012 | Steiner et al. |
| 2012/0250951 A1 | 10/2012 | Chen |
| 2013/0011068 A1 | 1/2013 | Albouyeh et al. |
| 2013/0018823 A1 | 1/2013 | Masood |
| 2014/0195609 A1* | 7/2014 | Wise ............. H04L 65/403 709/204 |
| 2014/0280553 A1 | 9/2014 | Hernandez et al. |
| 2014/0341442 A1 | 11/2014 | Lewis et al. |
| 2015/0039632 A1 | 2/2015 | Leppanen et al. |
| 2015/0163184 A1 | 6/2015 | Kanter et al. |
| 2015/0242638 A1 | 8/2015 | Bitran et al. |
| 2016/0004873 A1 | 1/2016 | Bao et al. |
| 2016/0034704 A1 | 2/2016 | Shim et al. |
| 2016/0048849 A1 | 2/2016 | Shiftan et al. |
| 2017/0177589 A1* | 6/2017 | Shorman ............ H04L 63/101 |

OTHER PUBLICATIONS

Besmer et al., "Moving Beyond Untagging: Photo Privacy in a Tagged World", CHI 2010, Apr. 10-15, 2010, Atlanta, Georgia, USA, Copyright 2010, ACM, pp. 1563-1572.

Cutillo et al., "Privacy Preserving Picture Sharing: Enforcing Usage Control in Distributed On-Line Social Networks", SNS'12, Apr. 10, 2012, Bern, Switzerland, Copyright 2012, ACM, 6 pages.

Hu et al., "Multiparty Authorization Framework for Data Sharing in Online Social Networks", Data and Applications Security and Privacy XXV, Springer, 2011, pp. 29-43.

Squicciarini et al., "CoPE: Enabling Collaborative Privacy Managaement in Online Social Networks", Journal of the American Society for Information Science and Technology, vol. 62, Issue 3, 2011, 14 pages.

Zerr et al., "Privacy-Aware Image Classification and Search", SIGIR' 12, Aug. 12-16, 2012, Portland, Oregon, USA, Copyright 2012, ACM, 11 pages.

Unknown, "Remove people from photo: the easy way", http://www.theinpaint.com/inpaint-how-to-remove-unwanted-people-from-photo.html, Feb. 29, 2012, 6 pages.

Appendix P, "List of IBM Patents or Patent Applications Treated as Related", 2 pages.

Hailu, Teshome, USPTO Final Office Action, U.S. Appl. No. 15/154,180, Notification dated Jul. 20, 2018, 15 pages.

Hailu, Teshome, USPTO Office Action, U.S. Appl. No. 15/154,180, Notification dated Nov. 16, 2018, 13 pages.

Teshome Hailu, USPTO Final Office Action, U.S. Appl. No. 15/154,180, Notification dated May 22, 2019, 15 pages.

Teshome Hailu, USPTO Notice of Allowance, U.S. Appl. No. 15/154,180, Notification dated Sep. 18, 2019, 7 pages.

* cited by examiner

| NAME | ENTITY | PREFERENCE DESCRIPTION | REMOVAL ACTION |
|---|---|---|---|
| JANE JONES | SODA | NOT ACME BRAND | REMOVE TAGGING |
| JANE JONES | JANE JONES | VIOLENT CONTEXT | REMOVE TAGGING |
| ACME CORP. | COMPANY LOGO | EXPLICIT CONTENT | SEEK APPROVAL |

CONTEXTUAL TAGGING OF A MULTIMEDIA ITEM

TECHNICAL FIELD

This invention relates generally to multimedia item tagging and, more specifically, to automatically removing a potential tag of a subject depicted in a multimedia item based on a context of the multimedia item and/or preferences of the subject being tagged.

BACKGROUND

In information systems, a tag can be defined as a non-hierarchical keyword, name, or term that can be assigned to a piece of information (such as an Internet bookmark, digital image, or computer file). Tags can, among other things, help describe an item and/or can allow it to be found again during browsing or searching. Tags are sometimes chosen informally and personally by the item's creator or by its viewer, depending on the system. Tagging has become popular due to the growth of social networking and applications which can allow users to publish and share multimedia items (e.g., photographs, videos, etc.). These applications can allow users to create and/or manage tags that categorize content using simple keywords. Tags can also provide a convenient way for individuals and businesses to expand the reach of a message or photo. Tags can also allow users to find content like pictures and videos that they might otherwise not have seen.

SUMMARY

In general, embodiments of the present invention provide for automatically removing a potential tag of a subject depicted in a multimedia item based on a context of the multimedia item and one or more preferences of the subject being tagged. Specifically, a request to tag a subject in the multimedia item is received, and the multimedia item is analyzed to determine a context. The context is compared to the preferences related to the subject to determine a variance. If a variance exists, a removal action related to the tag is performed, such as disallowing or removing the potential tag.

One aspect of the present invention includes a computer-implemented method for removing a potential tag of a subject depicted in a multimedia item, the method comprising: receiving a request to tag a subject in the multimedia item; analyzing, in response to the request, the multimedia item to determine a context of the multimedia item; comparing the context to one or more preferences related to the subject to determine a variance between the context and the one or more preferences; and performing a removal action when a variance is determined.

Another aspect of the present invention includes a computer system for automatically removing a potential tag of a subject depicted in a multimedia item, the computer system comprising: a memory medium comprising program instructions; a bus coupled to the memory medium; and a processor for executing the program instructions, the instructions causing the system to: receive a request to tag a subject in the multimedia item; analyze, in response to the request, the multimedia item to determine a context of the multimedia item; compare the context to one or more preferences related to the subject to determine a variance between the context and the one or more preferences; and perform a removal action when a variance is determined.

Yet another aspect of the present invention includes a computer program product for automatically removing a potential tag of a subject depicted in a multimedia item, and program instructions stored on the computer readable storage device, to: receive a request to tag a subject in the multimedia item; analyze, in response to the request, the multimedia item to determine a context of the multimedia item; compare the context to one or more preferences related to the subject to determine a variance between the context and the one or more preferences; and perform a removal action when a variance is determined.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments of the present invention provide for automatically removing a potential tag of a subject depicted in a multimedia item based on a context of the multimedia item and one or more preferences of the subject being tagged. Specifically, a request to tag a subject in the multimedia item is received and the multimedia item is analyzed to determine a context. The context is compared to the preferences related to the subject to determine a variance. If a variance exists, a removal action related to the tag is performed, such as disallowing or removing the potential tag.

A variety of electronic communication mechanisms exist. Some mechanisms such as email, instant message, and the file transfer protocol allow communication of different types of content between particular parties. Other mechanisms such as social networking sites, video and photo sharing sites, provide users with some mechanisms for widely sharing or distributing multimedia content.

The inventors of the invention described herein have recognized certain deficiencies in known methods for tagging multimedia items. With the increasing usage of today's social media platforms, users are more easily able to add multimedia content that can reach broader audiences. However, a subject of a particular multimedia item may not want the item to be tagged in the item due to the context of the item. For example, a person (e.g., teacher or judge) who is depicted in a photo having an alcoholic drink may not want the photo to be tagged with the person's name on a social media site to be displayed to others. The approaches described herein provide a seamless way for automatically removing a potential tag of a subject depicted in a multimedia item based on a context of the multimedia item and one or more preferences of the subject being tagged.

Figure 1:
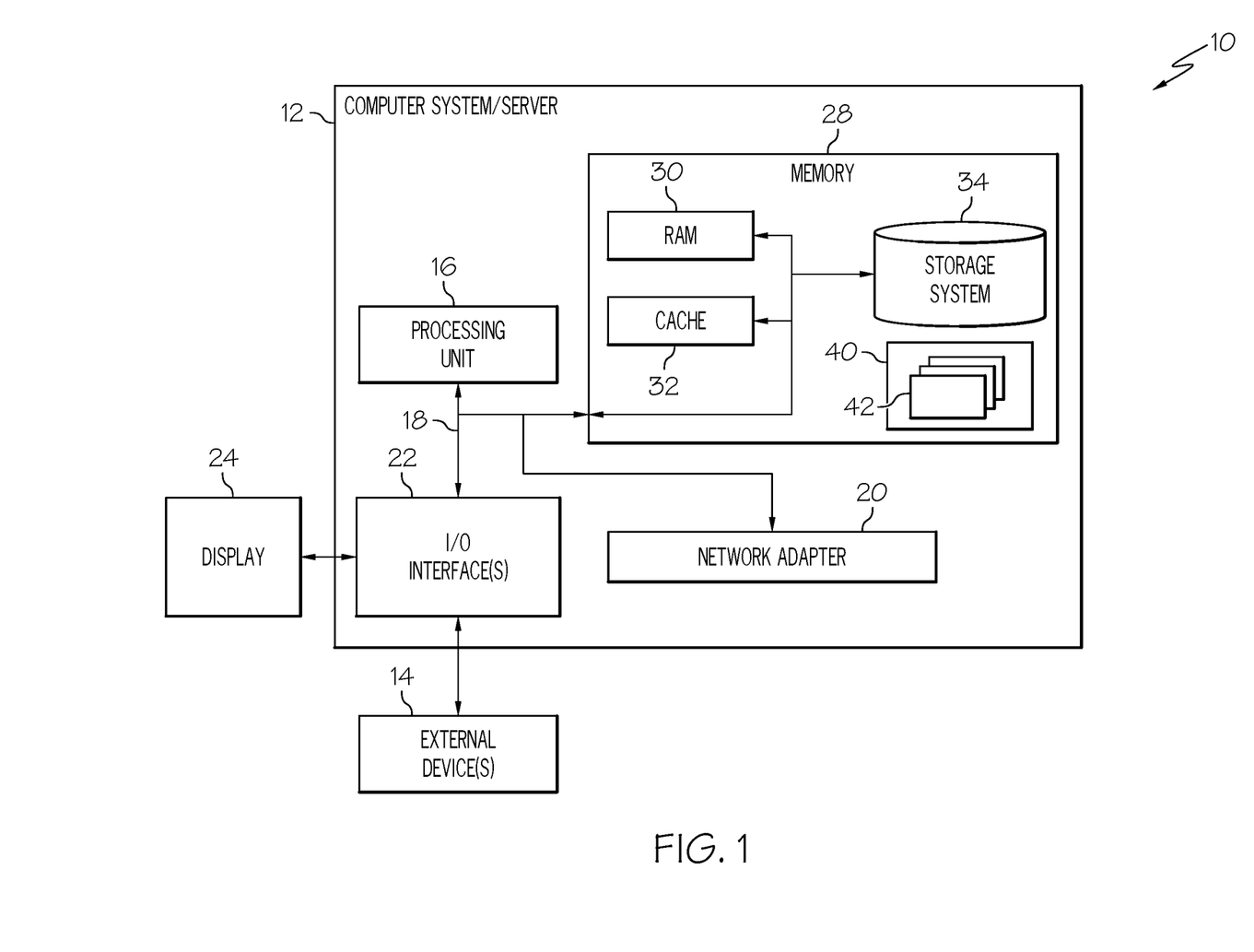
FIG. 1 shows an architecture 10 in which the invention may be implemented according to illustrative embodiments.

Referring now to FIG. 1, a computerized implementation 10 of an embodiment for automatically removing a potential tag of a subject depicted in a multimedia item based on a context of the multimedia item and one or more preferences of the subject being tagged will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 12 represents an illustrative system for automatically removing a potential tag of a subject depicted in a multimedia item based on a context of the multimedia item and one or more preferences of the subject being tagged. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for automatically removing a potential tag of a subject depicted in a multimedia item based on a context of the multimedia item and one or more preferences of the subject being tagged, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
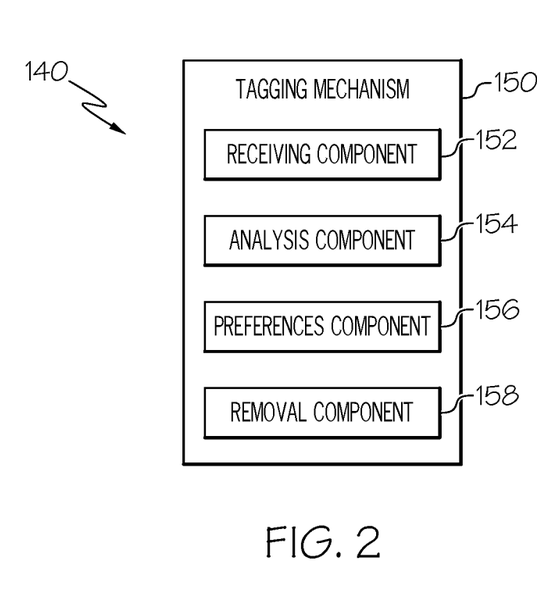
FIG. 2 shows a block diagram illustrating a tagging mechanism 150 according to illustrative embodiments.

Referring now to FIG. 2, a block diagram 140 describing the functionality discussed herein according to an embodiment of the present invention is shown. It is understood that the teachings recited herein may be practiced within any type of computing environment (e.g., computer system 12). To this extent, the teachings recited herein may be practiced within a stand-alone computer system or within a networked computing environment (e.g., a client-server environment, peer-to-peer environment, distributed computing environment, cloud computing environment, and/or the like). If the teachings recited herein are practiced within a networked computing environment, each physical server need not have a tagging mechanism (hereinafter "system 72"). Rather, system 72 could be loaded on a server or server-capable device that communicates (e.g., wirelessly) with the physical server to provide beacon diagnosis therefor. Regardless, as depicted, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 2 for brevity purposes.

Referring again to FIGS. 1 and 2, receiving component 152 of system 72, as executed by computer system/server 12, is configured to receive a request to tag a subject (e.g., a person) depicted in a multimedia item. Tagging can be carried out to perform functions such as aiding in classification, marking ownership, noting boundaries, and indicating online identity. They may take the form of words, images, or other identifying marks. An analogous example of tags in the physical world is museum object tagging. The multimedia item may be, for example, still digital graphics or photographs, as well as video segments, computer display screen images, pages (e.g., Web pages, office application pages, such as slides from PowerPoint® software from Microsoft Corporation, or pages from word processing software, etc.), or the like. A photo will be used as an exemplary multimedia item in the discussion below. This example is not intended to be limiting, but is used only for convenience and clarity.

Figure 3:
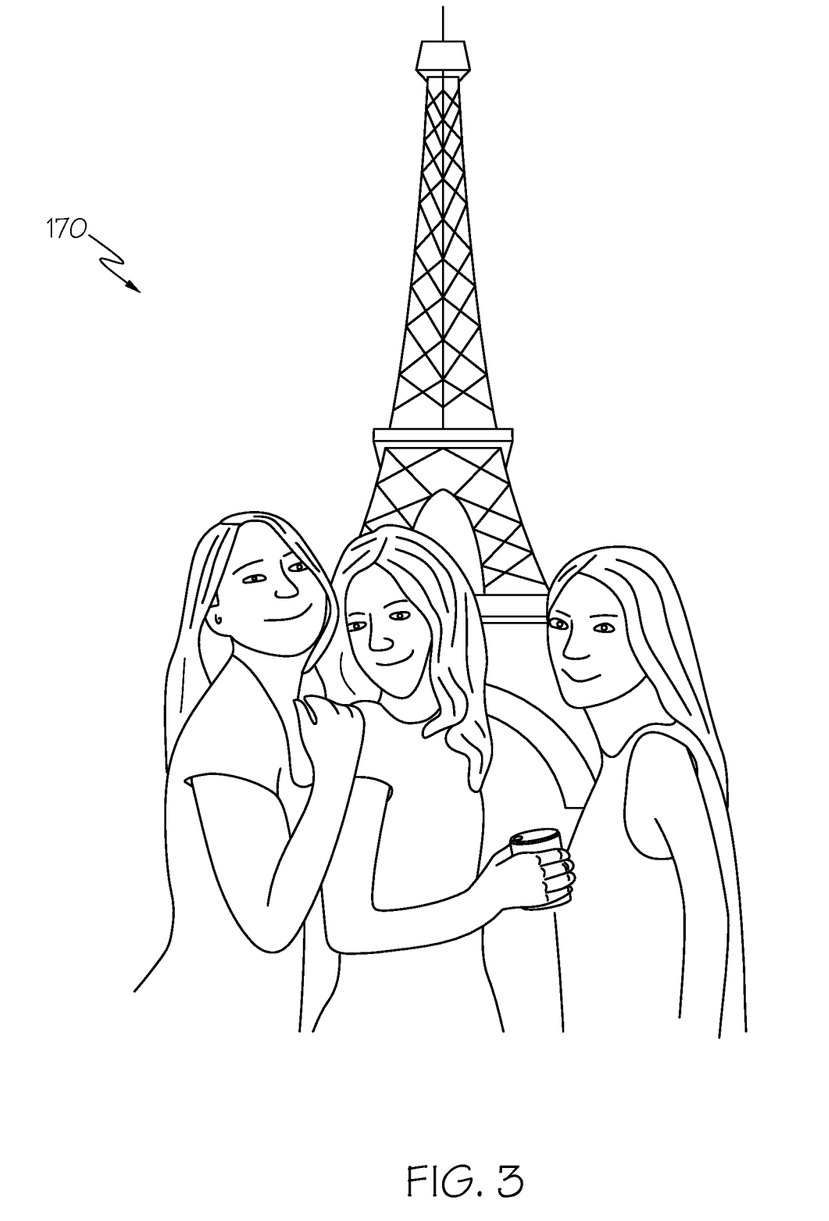
FIG. 3 shows an example multimedia item 170 according to illustrative embodiments.

FIG. 3 shows an example multimedia item 170 (e.g., photo) depicting three friends on vacation in Paris, France. The ladies in the photo are having fun sightseeing during a day in Paris near the Eiffel Tower. The lady on the far left (Susan 17A) wishes to upload the photo to a social networking site and tag the photo with the names of those depicted so that her friends and family back in the United States can share in the fun. The lady next to Susan in the photo is Jane Jones 172B, a famous celebrity enjoying a relaxing time with her friends. For example, Susan may click the photo to expand it, hover over the photo and click 'tag photo' at the bottom of the photo in order to tag Jane 172B.

In response to the request received by receiving component 152, analysis component 154 of system 72, as executed by computer system/server 12, is configured to perform multimedia item processing techniques on a multimedia item to determine a context of the multimedia item. For example, analysis component 154 may use known image processing techniques to determine a context of a photo. Analysis component 154 may interrogate the metadata of a multimedia item to determine this kind of information. For example, the date, time, and location in which a photo was captured may provide a context for the photo. Along with the date and time of capture, a typical modern smartphone can embed geospatial metadata in each photo it takes. The geospatial metadata typically includes global positioning system (GPS) coordinates corresponding to the place of capture of the photo, but may also include local weather, local attractions, local events, or the like, at the time of capture of the corresponding photo.

The specific elements depicted in the multimedia item may provide additional context of the item. In an embodiment, analysis component 154 may identify one or more persons, corporate indicators (e.g., logos, trademarks, brands, etc.), and/or contextual indicators (beverages, setting indicators (e.g., Eiffel Tower)), religious icons, etc.) depicted in the item. For example, a photo may include several people posing for a photo as they attend a football game. One person may be holding a soda and a bag of popcorn while wearing a sweatshirt emblazoned with a logo. A football goal post may be visible in the background. In this example, each person, the soda, the bag of popcorn, the goal post, and the logo are specific elements (e.g., persons, corporate indicators, contextual indicators, etc.) which provide context to the photo.

Figure 4:
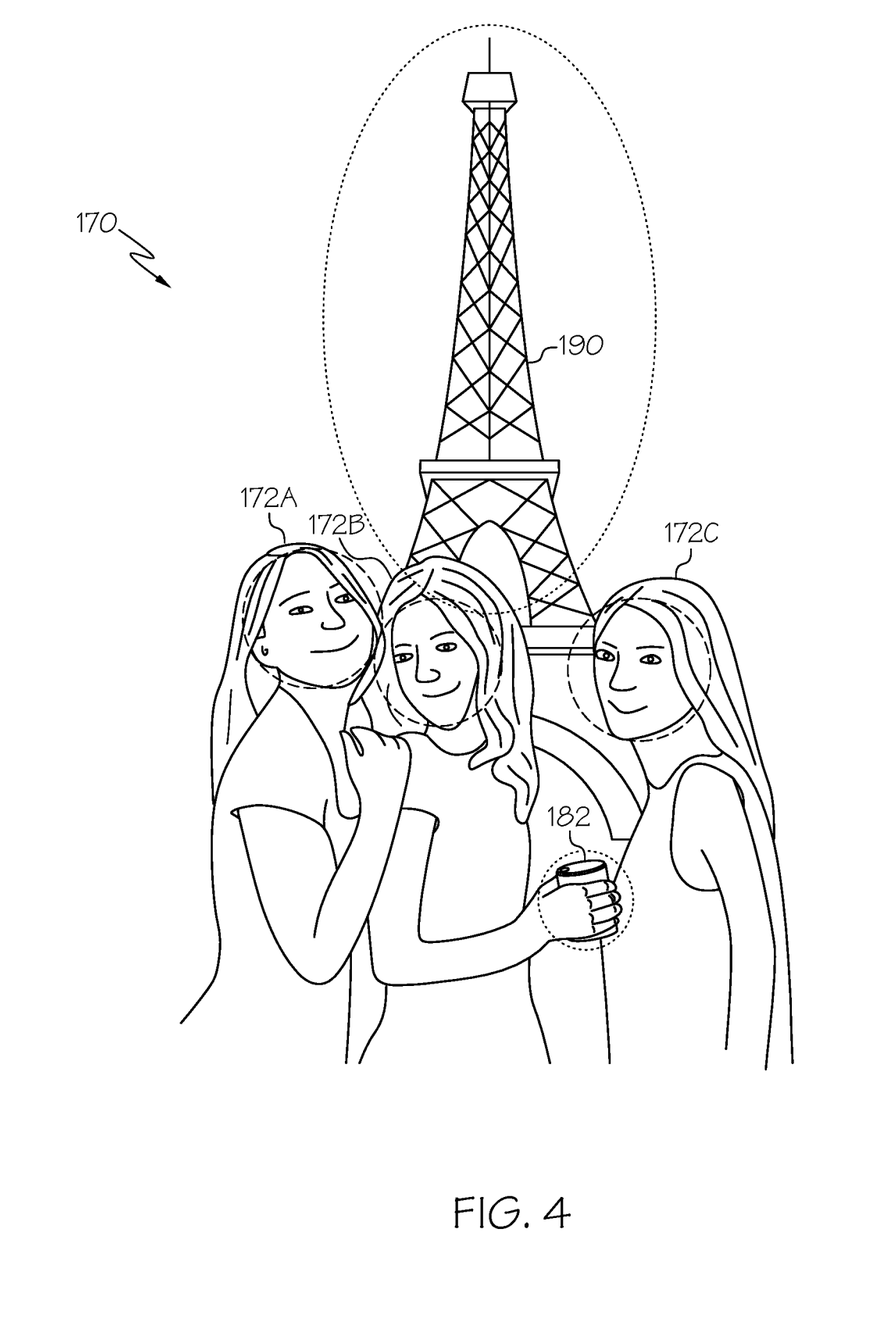
FIG. 4 shows multimedia item 170 of FIG. 3 with specific elements highlighted according to illustrative embodiments.

FIG. 4 shows a multimedia item (i.e., photo 170) with specific elements highlighted. As shown, FIG. 4 depicts friends 172A-C(including Susan 172A and Jane Jones 172B) sightseeing near the Eiffel Tower in Paris. One of the friends, Jane Jones 172B, is depicted drinking a soda 182. Jane Jones 172B is a celebrity and she endorses ACME brand of soda. However, soda 182 is not the ACME brand of soda.

In an embodiment, analysis component 154 may determine one or more specific elements using known image processing techniques such as facial and image recognition technologies. Facial recognition technology may be used to identify or verify a person from a digital image or a video frame from a video source. One of the ways the technology accomplishes this is by comparing selected facial features from the image and a set of reference photos, such as those stored on a social networking site.

Furthermore, analysis component 154 is configured to employ known techniques such as image recognition technology to identify any number of items depicted in the photo. Image recognition is the process of identifying and detecting an object or a feature in a digital image or video. In addition, a user may also add keywords or other metadata to a photo. For example, a user can include the subject, names of people in the photo, location, a description of the location, and other relevant information by tagging the photo. Along with facial recognition technology, analysis component 154 may identify one or more persons depicted in a photo previously tagged with the respective person's name by ascertaining the name from the tag (i.e., metadata). For example, Janet 172C may have been previously tagged in the photo and her identity can be ascertained from the tag.

In an embodiment, a cognitive assessment may be initiated when the subject of the potential tag is a person. For example, analysis component 154 may employ known image processing techniques to dynamically detect a facial expression, clothing, body posture, and the like, of the subject. Referring back to FIG. 4, Susan 172A wishes to tag Jane 172B in photo 170. Using known image processing techniques, analysis component 154 is able to identify contextual indicators such as the Eiffel Tower 190 and soda 182 being consumed by Jane 172B. In addition, analysis component 154 determines that Jane 172B is nicely attired and has a smile on her face after performing the cognitive assessment. In another embodiment, analysis component 154 may initiate a cognitive assessment on additional persons identified in a multimedia item, not just the person subject to the potential tag when determining the context of the item.

Preferences component 156 of system 72, as executed by computer system/server 12, is configured to determine any whether preferences are related to a subject of a potential tag depicted in a multimedia item. In an embodiment, a subject may include a person. A subject of a potential tag may also include any specific element that can be associated with a company (logo, trademark, etc.) or brand owner (e.g., brand). For example, a shirt containing a company's logo or a shirt of a particular brand.

A subject's preferences may be stored in a profile or preferences database. The preferences may relate to the content (e.g., people or objects), date, time of day, location, setting, body posture, facial expression, clothing, multimedia type (photo, video, etc.), or the like, of the multimedia item. In an embodiment, preferences of a person/company may explicitly provide the types of content that the subject does not want to be associated with. For example, a person identified in a particular photo may only allow photos to be tagged indicating his/her identity when his/her eyes are fully open (i.e., not closed or half-closed), smiling, fully attired, and not captured in a location known to sell alcoholic beverages.

Figure 5:
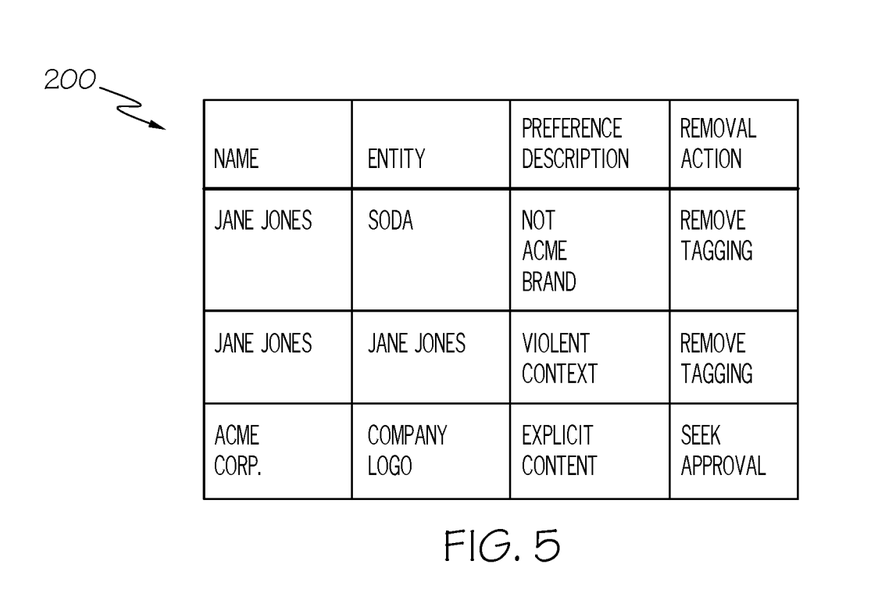
FIG. 5 shows example preference table 200 according to illustrative embodiments.

FIG. 5 shows example preference table 200 having the following columns: name, entity, preference description, and removal action. Preference table 200 is for exemplary purposes only and not intended to be limiting. As shown, preference table 200 includes two rows for Jane Jones 172B. Since Jane 172B is a celebrity having an endorsement deal with ACME brand soda, she does not want to be tagged in any multimedia items depicting her if she is enjoying a soda of a different brand. She also does not wish to be tagged in any multimedia items determined to be in a violent setting.

In an embodiment, preferences may be automatically generated based on a historical baseline associated with the subject. For example, a web site (e.g., photo-sharing site, social networking site, etc.), allows users to upload photos and to tag people in the photos. The photos that a user has uploaded, and the particular people who have been tagged in those photos, provides a historical baseline for those appearing in the photos. For example, in photos that a given user has uploaded, 20 different people might be tagged, and 15 of those people might appear particularly frequently. One of those people tagged is a woman who is an elementary school teacher, a friend of the user. Photos captured depicting the teacher in which she has been tagged include conservative locations (e.g., school, church, public events, etc.) in which she is nicely attired. These photos provide a historical baseline context for the teacher. In addition, any other content that depicts or discusses the subject (posts, "likes", etc.) may be evaluated when compiling the historical baseline. Since she is a teacher, it is important for her to maintain a respected reputation in the community. She likely would not appreciate someone tagging her in a photo when she is in an unflattering location or setting.

In yet another example, a subject to be tagged may include a company's product or company logo. A company's preferences regarding how its product(s) and logo(s) are depicted may vary based on the type of company. A company having a conservative reputation may define its preferences so that no product or logo associated with the company depicted in a multimedia item that may be considered inappropriate or offensive to some can be tagged with the company name without consent from someone authorized by the company (e.g., company administrator, press release coordinator, etc.). Alternatively, preferences of a different company may not be defined as stringently. In another embodiment, preferences related to a company may also be derived (in whole or in part) from industry standards. For example, preferences for a particular company may be derived based on the defined preferences of other similar companies (e.g., retail industry, sports products, etc.).

Removal component 158 of system 72, as executed by computer system/server 12, is configured to compare the determined context of the multimedia item with preferences associated with the subject to be tagged. If a variance exists between the two (e.g., one or more preferences are not met), removal component 158 is configured to perform a removal action. The type of removal action may be based upon the type of multimedia item, subject, type of subject (e.g., person, object, logo, etc.), subject preference(s), industry standard, or the like. In an embodiment, removal component 158 may disallow or automatically remove the tag of the subject in the multimedia item. In another embodiment, removal component 158 may request permission from the subject (or a person authorized to represent the subject) to allow tagging the subject in the multimedia item. The request may be made via instant message or alert (e.g., in a social networking site), email message, text message, or the like. If an approval is not received, removal component 158 may disallow or automatically remove the tag of the subject in the multimedia item.

Referring back to FIGS. 4 and 5, Susan 172A attempts to tag Jane 172B in photo 170 on a social networking site. The photo includes Jane 172B holding soda 182. The preferences of Jane Jones 172G, as shown in reference table 200, indicate that Jane does not want to be tagged in any multimedia items depicting her if she is holding/drinking a brand of soda different than ACME brand. Jane 172G has an endorsement deal with ACME brand soda. Therefore, tagging of Jane 172B will not be allowed in this example based on her preferences and the specific elements depicted in the photo.

Figure 6:
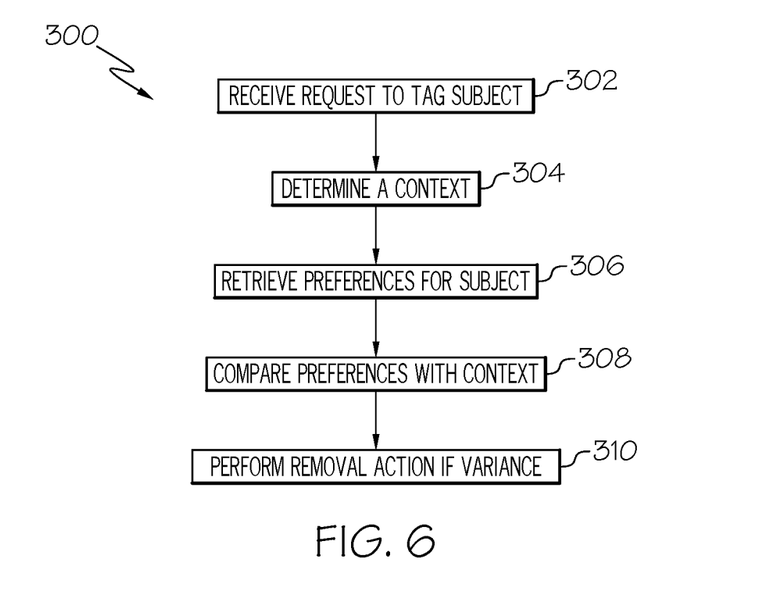
FIG. 6 shows a process flowchart 300 for automatically removing a potential tag of a subject depicted in a multimedia item according to illustrative embodiments.

Referring now to FIG. 6, in conjunction with FIGS. 1 and 2, an implementation of a process 300 for automatically removing a potential tag of a subject depicted in a multimedia item based on a context of the multimedia item and one or more preferences of the subject being tagged is shown. At step 302, a request to tag a subject depicted in a multimedia item is received. At step 304, in response to the request, the multimedia item is analyzed to determine a context of the multimedia item. The context includes a content of the multimedia item. The context may include the mental state, posture, and/or behavior of individuals in the multimedia item. In addition, any violence or illicit activity may be determined using known methods. At step 306, preferences related to the subject are retrieved. At step 308, the context is compared against the preferences of the subject to determine whether a variance exists. At step 310, based on the comparison, a removal action related to the subject may be performed when a variance is determined.

Process flowchart 300 of FIG. 6 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for automatically removing a potential tag of a subject depicted in a multimedia item based on a context of the multimedia item and one or more preferences of the subject being tagged. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for automatically removing a potential tag of a subject depicted in a multimedia item based on a context of the multimedia item and one or more preferences of the subject being tagged. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches to evaluate a potential tag of a subject depicted in a multimedia item based on a context of the multimedia item and one or more preferences of the subject being tagged. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method of automatically preventing personal identification of a subject depicted in a multimedia item, the method comprising:
   receiving, at a website, a request by a posting user to tag a subject in the multimedia item;
   analyzing, by the at least one computer device, in response to the request, a subject matter contained in the multimedia item to determine a context in which the subject is being portrayed in the multimedia item that includes a set of elements depicted in the multimedia item;
   comparing, by the at least one computer device, the context to a plurality of preferences related to the subject to automatically detect whether there is a variance between the context and the plurality of preferences, wherein each preference of the plurality of preferences specifies a different element of a group of pre-identified elements that the subject does not want to be associated with, the subject being a non-posting user, and wherein variances are determined in cases in which the at least one computer device automatically detects that there is at least one element of the group of pre-identified elements that the subject does not want to be associated with in the set of elements depicted in the multimedia item with the subject;
   performing, by the at least one computer device, a removal action when a variance is automatically detected that indicates that there is at least one element of the set of elements depicted in the multimedia item is one of the pre-identified elements that the subject does not want to be associated with; and
   performing no removal action in a different multimedia item in which the computer device automatically detects, using the plurality of preferences, that none of the pre-identified elements that the subject does not want to be associated with are depicted in the different multimedia item with the subject.

2. The computer-implemented method of claim 1, wherein the removal action includes disallowing or automatically removing the potential tag.

3. The computer-implemented method of claim 1, wherein the removal action includes requesting permission from the subject to allow the subject to be tagged.

4. The computer-implemented method of claim 1, wherein the preferences are defined by the subject or a representative of the subject.

5. The computer-implemented method of claim 1, wherein the preferences are automatically generated based on historical baseline associated with the subject, wherein the historical baseline includes any content depicting or discussing the subject in a social media profile belonging to the subject.

6. The computer-implemented method of claim 1, wherein the subject is a person.

7. The computer-implemented method of claim 6, wherein determining a context includes performing a cognitive assessment of the subject.

8. A computer system of automatically preventing personal identification of a subject depicted in a multimedia item, the computer system comprising:
   a memory medium comprising program instructions;
   a bus coupled to the memory medium; and
   a processor for executing the program instructions, the instructions causing the system to:
   receive, at a web site, a request by a posting user to tag a subject in the multimedia item, the entity being a non-posting user;
   analyze, in response to the request, a subject matter contained in the multimedia item to determine a context in which the subject is being portrayed in the multimedia item that includes a set of elements depicted in the multimedia item;
   compare the context to a plurality of preferences related to the subject to automatically detect whether there is a variance between the context and the plurality of preferences, wherein each preference of the plurality of preferences specifies a different element of a group of pre-identified elements that the subject does not want to be associated with, the subject being a non-posting user, and wherein variances are determined in cases in which the at least one computer device automatically detects that there is at least one element of the group of pre-identified elements that the subject does not want to be associated with in the set of elements depicted in the multimedia item with the subject;
   perform a removal action when a variance is automatically detected that indicates that there is at least one element of the set of elements depicted in the multimedia item is one of the pre-identified elements that the subject does not want to be associated with; and
   perform no removal action in a different multimedia item in which the computer device automatically detects, using the plurality of preferences, that none of the pre-identified elements that the subject does not want to be associated with are depicted in the different multimedia item with the subject.

9. The computer system of claim 8, wherein the removal action includes disallowing or automatically removing the potential tag.

10. The computer system of claim 8, wherein the removal action includes requesting permission from the subject to allow the subject to be tagged.

11. The computer system of claim 8, wherein the preferences are defined by the subject or a representative of the subject.

12. The computer system of claim 8, wherein the preferences are automatically generated based on historical baseline associated with the subject, wherein the historical baseline includes any content depicting or discussing the subject in a social media profile belonging to the subject.

13. The computer system of claim 8, wherein the subject is a person.

14. The computer system of claim 13, wherein determining a context includes performing a cognitive assessment of the subject.

15. A computer program product of automatically preventing personal identification of a subject depicted in a multimedia item, and program instructions stored on the computer readable storage device, to:

receive, at a website, a request by a posting user to tag a subject in the multimedia item;

analyze, in response to the request, a subject matter contained in the multimedia item to determine a context in which the subject is being portrayed in the multimedia item that includes a set of elements depicted in the multimedia item;

the context to a plurality of preferences related to the subject to automatically detect whether there is a variance between the context and the plurality of preferences, wherein each preference of the plurality of preferences specifies a different element of a group of pre-identified elements that the subject does not want to be associated with, the subject being a non-posting user, and wherein variances are determined in cases in which the at least one computer device automatically detects that there is at least one element of the group of pre-identified elements that the subject does not want to be associated with in the set of elements depicted in the multimedia item with the subject;

perform a removal action when a variance is automatically detected that indicates that there is at least one element of the set of elements depicted in the multimedia item is one of the pre-identified elements that the subject does not want to be associated with; and perform no removal action in a different multimedia item in which the computer device automatically detects, using the plurality of preferences, that none of the pre-identified elements that the subject does not want to be associated with are depicted in the different multimedia item with the subject.

16. The computer program product of claim 15, wherein the removal action includes disallowing or automatically removing the potential tag.

17. The computer program product of claim 15, wherein the removal action includes requesting permission from the subject to allow the subject to be tagged.

18. The computer program product of claim 15, wherein the preferences are defined by the subject or a representative of the subject.

19. The computer program product of claim 15, wherein the preferences are automatically generated based on historical baseline associated with the subject, wherein the historical baseline includes any content depicting or discussing the subject in a social media profile belonging to the subject.

20. The computer program product of claim 15, wherein the subject is a person and determining a context includes performing a cognitive assessment of the subject.

* * * * *